United States Patent [19]

Zinniger et al.

[11] 4,032,608

[45] June 28, 1977

[54] CRYOGENIC LIQUID CONTAINMENT METHOD

[75] Inventors: Theodore C. Zinniger, Livermore; Phillip J. Burke, San Jose, both of Calif.

[73] Assignee: Kaiser Aluminum & Chemical Corporation, Oakland, Calif.

[22] Filed: Aug. 22, 1975

[21] Appl. No.: 607,086

Related U.S. Application Data

[62] Division of Ser. No. 487,959, July 12, 1974, Pat. No. 3,927,788.

[52] U.S. Cl. .............................. 264/46.6; 220/9 F; 220/9 LG; 264/45.1; 264/46.7; 264/255; 264/267; 264/309; 427/236; 427/373; 427/421

[51] Int. Cl.² ........................................ B29D 27/00

[58] Field of Search .................. 264/54, 46.4, 46.5, 264/DIG. 72, 255, 267, 309, 46.6; 220/9 F, 9 LG; 427/210, 256, 421, 236, 323, 421

[56] References Cited

UNITED STATES PATENTS

| | | | |
|---|---|---|---|
| 1,935,916 | 11/1933 | Ragsdale | 264/DIG. 72 |
| 2,779,689 | 1/1957 | Reis | 264/54 X |
| 3,184,210 | 5/1965 | Fassnacht et al. | 264/54 X |
| 3,303,617 | 2/1967 | Hessburg et al. | 264/46.5 X |
| 3,429,085 | 2/1969 | Stillman | 264/46.4 X |
| 3,767,336 | 10/1973 | Casey | 264/54 X |
| 3,879,240 | 4/1975 | Wall | 264/46.5 X |
| 3,904,068 | 9/1975 | Beaujean | 220/9 LG X |
| 3,929,247 | 12/1975 | Borup | 220/9 LG |
| 3,931,908 | 1/1976 | Cheyney | 220/9 LG X |

OTHER PUBLICATIONS

Knox, R. E., "Froth Spraying of Rigid Urethane Foam", in *Chemical Engineering Progress* (vol. 59, No. 7), July 1963, pp. 74–78.

Bowman, R. A., "Rigid Polyurethane Spray Foam Technology", in 20th Annual Technical Conference of Society of Plastics, Engineers, Inc. Technical Papers, vol. X, Atlantic City, N.J., Jan. 27–Jan. 30, 1964, pp. 1–4(XXVI).

*Primary Examiner*—Philip Anderson
*Attorney, Agent, or Firm*—Paul E. Calrow; John S. Rhoades

[57] ABSTRACT

Improved insulation system for cryogenic vessels wherein substantially uniform stress levels under loads are maintained in various parts of the foam insulating material layers applied to the wall structures of such vessels and methods for applying foam insulating materials to the said vessel wall structures.

5 Claims, 10 Drawing Figures

CRYOGENIC LIQUID CONTAINMENT METHOD

This is a division of application Ser. No. 487,959 filed July 12, 1974, now U.S. Pat. No. 3,927,788.

BACKGROUND OF THE INVENTION

This invention relates to a method of manufacturing thermal insulation systems for bulk cargo tanks used in the transportation and/or storage of liquefied and/or compressed gases. More particularly, it is concerned with the manufacture of an improved system for inhibiting the fracture of and maintaining substantially uniform stress levels in various parts of one or more layers of cryogenic foam used to thermally insulate and isolate bulk cargo tanks from the hull structures of vessels in which they are mounted. This system is particularly applicable to the installation of insulation material in converging wall areas which define a corner section of a cryogenic liquid containment structure.

Many proposals have been made to date to alleviate and/or compensate for the severe static and/or dynamic stresses imposed on liquefied gas bulk cargo tanks and particularly the corner sections of shipboard tanks during use. Static stresses can be caused by the particular water ballast conditions of the cargo vessel, or by the extreme temperature variations that occur in such tanks during normal use as well as during loading and unloading. The severe dynamic stresses, set up in such shipboard tank structures, can be due, for example, to liquid cargo accelerations and the sloshing of the liquid cargo in the tanks during ocean transport as well as from the deflections and bendings of the transport vessel itself when moving through heavy seas.

Such proposals have resulted in the rather complex corner structures, etc. illustrated in prior U.S. Pat. Nos. 3,150,794, 3,490,639, 3,319,431, 3,406,858, 3,622,030, 3,613,932, 3,687,087, 3,712,500, 3,757,982 and 3,780,900. These patents are generally representative of the several principal type cryogenic liquid containment systems used today in ocean-going transport vessels and to which the intant invention is applicable. The tanks of such systems are commonly referred to as "prismatic free-standing tanks", "spherical free-standing tanks", "semi-membrane tanks", and "membrane tanks" and reference may be made to a paper presented by William DuBarry Thomas et al to the Society of Naval Architects and Marine Engineers on Nov. 11–12, 1971, and entitled "LNG Carriers — The Current State of the Art" for a detailed discussion of these different type tanks and their respective merits.

As indicated by the aforesaid patents, attempted solutions to the loading and stress problems have tended to concentrate on improving the metallic or other structural supports for the corner sections of a given tank in a cryogenic containment system rather than on improving the structure of the cryogenic insulation as such. Other proposals have emphasized compensating for only a single type of stress, e.g. static or dynamic, rather than being addressed to solving both types of stresses.

The above problems have been further aggravated in the case of acceptable cryogenic urethane foams, such as those discussed in U.S. Pat. No. 3,757,982 and copending application Ser. No. 378,138 of Herbert H, Borup, filed July 11, 1973 now U.S. Pat. No. 3,929,247. Such foams, when emplaced and fully cured, frequently become relatively rigid and brittle and will tend to crack undr severe stresses unless adequate compensation is made therefor, such as by use of the complex balsa wood and/or plywood supporting structures or pads of the prismatic free-standing tank system, etc.

The instant invention is concerned with a simplified procedure for compensating for and/or alleviating dynamic as well as static stresses imposed on the insulation particularly in the corner section of a cryogenic bulk cargo tank structure. This is accomplished by a thickness reduction of selected portions of the insulation itself whereby the insulation in such corner section will tend to act as a hinge and flex under loads rather than cracking while at the same time uniformly distributing loads to other flat or planar portions of the insulation. For the purposes of this specification and claims, a corner structure shall be considered as comprising at least two convergent walls.

SUMMARY OF THE INVENTION

The present invention is directed to a method to manufacturing an improved system for utilizing relatively rigid and brittle cryogenic foams alone or in combination with perlite, fiberglass, metal foils, mylar and nylon netting, etc. in the corner or other areas of a cryogenic liquid tank containment system wherein certain cross-sectional corner portions of the foam layer are made thinner than other portions of such foam layer to give flexibility to the foam in such corners in the manner of the battery casing of U.S. Pat. No. 3,816,181. The thinned portions of a foam layer of insulation at the corner areas of a cryogenic tank containment system advantageously provide a hinge point about which the insulation will flex or bend rather than fracture under stress and one or more layers of selectively thinned foam can be applied to the corner. Thus, various portions of the same overall layer of foam insulation will remain integrated regardless of how much movement occurs in the structural portions of the tank corner section containing part of such foam layer.

Disposed in between the usual metallic walls of the cryogenic tank joint structure and the thinned foam section is an appropriate amount or section of backer material. This backer material can be either a flexible material, which adheres to the foam or it can be a nonadherent rigid backer foam material anchored to the metallic substrate and slidable relative to the flexible or bendable urethane foam so there will be no shear stress transfer between the backer foam and the flexible foam. In one preferred embodiment of the invention, the thick/thin areas of a flexible foam layer can be effectively built up by the particular manner of application, e.g. by spraying the foam on or by a pour of froth technique in the corner section of the tank. The selected thinned or hinge-like foam sections of a given foam layer cause a uniform stress level to be maintained under various corner loading conditions throughout substantially the entire foam layer and with the thinned foam section transferring loads rather than resisting the same and fracturing.

In general, the thinness of a given corner section of a foam layer is dependent primarily on the particular foam materials used, the anticipated temperature drop across the foam during use, the angle of bend of the corner section and the degree of flexibility of the backup material. Thus, a corner section of foam material can range from a materially thinned cross section of foam material in the case of an acute angled corner section to a moderately thinned cross section in the case of an obtuse angled corner section. In a corner section of approximately 90°, for example, the thinnest foam portion of a given foam layer can be about two-thirds the thickness of the thickest portions of the same foam layer in the adjacent flat or planar foam areas. The thinner corner foam section can also be advantageously corrugated and thus have the further character of an accordian-like structure. The backer materials in preferred embodiments of the invention should be fabricated from flexible materials of appropriate composition, such as foam rubber, foamed-polyurethane of the proper density and cell structure and be capable of withstanding uniform compressive loads on the order of 15 psi in the event the cryogenic liquid cargo tank associated therewith should fracture and break. Care should be exercised in selecting the backer material so that, in addition to withstanding various compressive loads, it can reduce the temperature drop across the main insulating foam layers in the corner where installed and not transmit shear loads.

DETAILED DESCRIPTION

Figure 1:
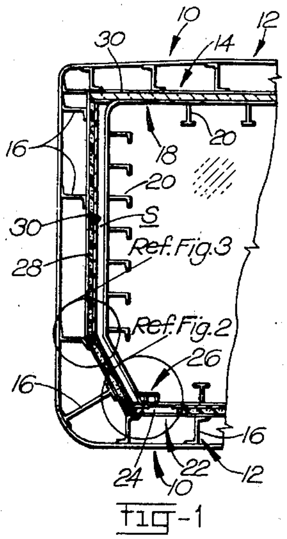
FIG. 1 is a vertical, fragmentary, cross-sectional view of a typical transport vessel cargo tank incorporating the improved corner arrangement of the instant invention.
Figure 2:
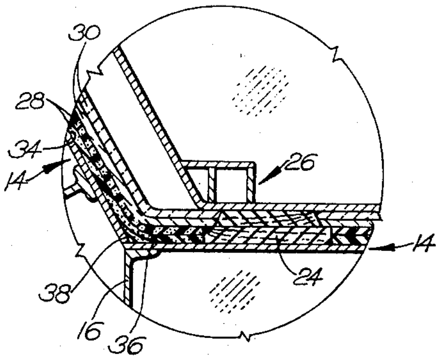
FIG. 2 is an enlarged section of a corner area of the cargo tank of FIG. 1 when generally taken within the circumscribing circle 2 thereof.
Figure 3:
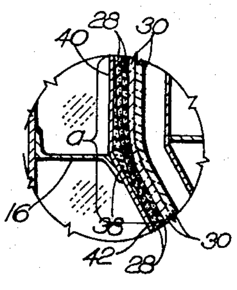
FIG. 3 is an enlarged section of another corner of the cargo tank of FIG. 1 when generally taken within the bounds of circumscribing circle 3 of FIG. 1.

With further reference to the drawings and, in particular, FIGS. 1–3, the instant invention is particularly applicable to prismatic free-standing tanks of the type shown in FIGS. 1 through 3A wherein the tanks are usually either flat sided and rectangular or, as illustrated, flat sided and tapered depending on shipboard location in order to utilize maximum ship volume. The hull structure 10 comprises an outer hull 12 and an inner hull 14 interconnected by the usual bulkhead members 16. The inner and outer hulls are fabricated from appropriate ferrous metal plates members secured together in the usual fashion. The inner prismatic tank 18 which is adapted to carry the cryogenic liquid cargo at temperatures on the order of −260° F. is advantageously made of aluminum, or a suitable nickel or stainless steel alloy because of the low temperature of its cargo. Tank 18 is interiorly reinforced by the standard girders or ribbing 20 and, as will be described, is appropriately thermally insulated and isolated from the main ferrous metal hull structure 10. The tank 18 can be supported on the bottom section 22 of inner hull 14 by means of the pads or blocks of end grain balsa, plywood panels 24 or the like in a manner well known in the art and tank 18 can be reinforced in the bottom corner areas which are subjected to severe loading and three dimensional stresses by interior metal decking assembly 26.

Prismatic tank 18 is advantageously isolated and insulated from the outer transport vessel hull 10 by an open space S along the sides and through the medium of a suitable cryogenic insulating material, such as a polyurethane foam 28 of the appropriate cell structure and density. This foam can be applied to the inside surfaces of inner hull 14 in the form of one or more layers and, thereafter, if desired, one or more layers of a different insulating material, such as fiberglass 30, can be superposed on the foam. In one embodiment of the invention, the foam layer or layers 28 can be used only along the sides and bottom of the inner hull 14 while the fiberglass layers 30 are applied not only to the side and bottom areas of hull 14, but also intermediate hull 14 and the top of tank 18. In the case of the sides and bottom of tank 18, the fiberglass layers 30 are disposed intermediate the cargo tank 18 and foam insulation 28.

The polyurethane foam layers 28 are secured to the inner hull 14 in accordance with accepted practices. Thus, they may be sprayed on the ship's inner hull 14 by automatically controlled spray devices that build up the deisred one or more successive layers after which one or more fiberglass layers 30 can be superposed upon the foam and secured thereto in a manner well known in the art. Alternately, instead of being sprayed and foamed in situ, the foam may be first molded into blocks of appropriate designs, i.e. curved or tapers for corner areas and then adhesively secured in place with prior priming of the metallic substrate, if required.

Figure 3A:
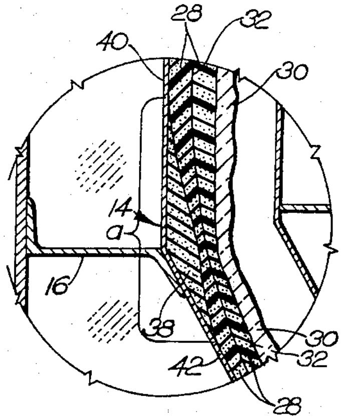
FIG. 3A is a view similar to FIG. 3 but somewhat enlarged and discloses a modification of the wall section illustrated in FIG. 3.
Figure 8:
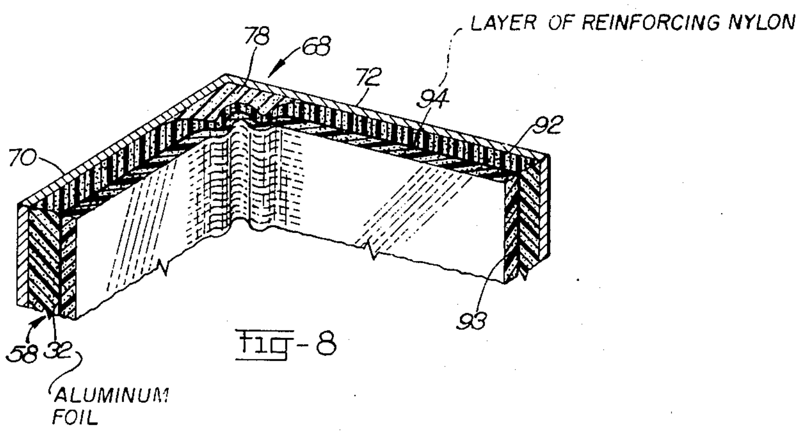
FIG. 8 is a fragmentary perspective view of an insulated corner section in a wet wall type cargo tank or the like and illustrates how the thinned foam section of one or more foam layers can also be corrugated.

If desired, various layers of nylon mesh or suitable polyester materials may also be interspersed between the fiberglass and the foam as well as in between individual layers thereof, or as indicated in FIGS. 3A and 8 and in the aforesaid U.S. Pat. No. 3,929,247 of Herbet H. Borup, a layer of aluminum foil 32 may be interposed between adjacent foam layers, etc.

The bottom of tank 18, as noted, is supported particularly in the load-bearing and potentially high stress bottom areas by way of the usual support pads 24. As indicated particularly in FIG. 2, in the corner of joint section of the hull where two wall portions 34 and 36 converge and meet adjacent the bottom of tank 18, the thickness of one or more of the individual foam layers 28 in these corner areas is selectively reduced as compared to the thickness of the foam in other areas of the same layers and in accordance with the considerations previously noted to give the foam the desired flexibility and hinge action under loads in such areas. As indicated in FIGS. 2, 3 and 3A, backing up the thinner sections of foam in the given joint or corner areas is a suitable backup material 38 which can be applied to a corner section prior to the emplacement of the foam material. Backup material 38 can be an appropriate foam rubber composition, foamed polyurethane, etc. all as previously described. Similar backup or filler materials 38 are appropriately applied to the cavity area *a* formed by the two converging side wall sections 40 and 42 of the inner hull section 14 and the curved and/or tapered and thinned portions of the layer or layers of foam 28 indicated in FIGS. 3 and 3A.

In one preferred embodiment of the invention, the thinnest portion, be it curved and/or tapered in the manner shown in FIG. 3A, of one or more given foam layers in a corner section of a containment structure, be it prismatic free-standing, membrane or wet wall, etc., should be not more than about two-thirds of the overall normal or greatest thickness of such layer or layers to provide the desired corner flexibility. This, if the overall normal and substantially uniform thickness of one or more layers of rigid foam in the flattened areas of a containment structure are on the order of about 6 inches in thickness, the thinnest sector of the same one or more layers in a given and adjacent corner area should not exceed about 4 inches to obtain the desirable flexibility and elasticity to absorb and transfer bending loads, etc.

Figure 4:
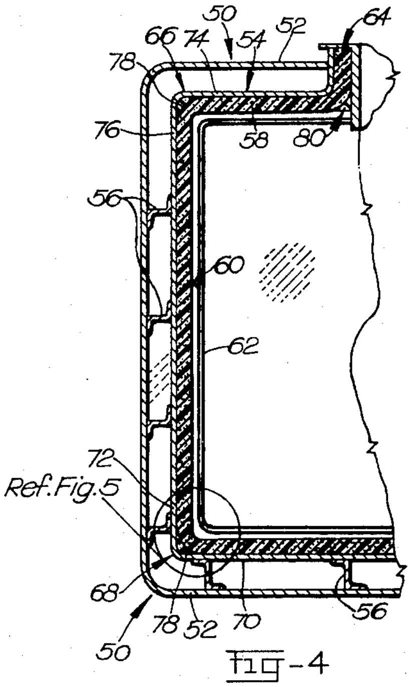
FIG. 4 is a fragmentary vertical cross-sectional view similar to that of FIG. 1 showing a membrane type transport vessel cargo tank in which the instant invention can be utilized.
Figure 5:
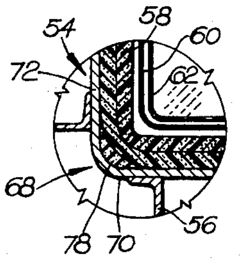
FIG. 5 is an enlarged, fragmentary section of a corner area of the vessel tank of FIG. 4 taken within the bounds of the circumscribing circle 5 of FIG. 4.

With further reference to the drawings and, in particular, FIGS. 4 and 5, these figures illustrate the application of the invention to membrane and semi-membrane type cryogenic liquid containment systems that can comprise a hull structure 50 made up of inner and outer hull sections 52 and 54 interconnected by the usual bulkhead elements 56. Attached to the rigid inner wall 54 in appropriate fashion such as by spraying or in the form of adhesively secured premolded blocks, etc. is one or more heat insulating layers of relatively rigid polyurethane foam 58 of the appropriate cell design and density. Disposed within the heat insulating layer of foam 58 is a membraneous vessel 60 that serves as the usual secondary containment vessel and a further membraneous type vessel 62 which acts as the primary liquid cargo container.

The one or more heat insulating layers 58 as indicated previously can be advantageously made of rigid polyurethane foam which, because of its composition, is ordinarily highly resistant to pressure, particularly if made of high density and closed cell construction. The inner membraneous vessels 60 and 62 are formed of thin sheets of low temperature resistant material, such as a nickel steel alloy, stainless steel or aluminum. The central roof portion of the tank is provided with the usual trunk or hatch opening 64 connected with the primary and secondary inner vessels 60 and 62 in gas-tight relationship. This trunk can be of the general type shown in U.S. Pat. No. 3,780,900 and can be equipped with the various loading and unloading gas pipes, etc. described therein. The cantilever arrangement disclosed in U.S. Pat. No. 3,780,900 may also be used to support inner vessels 60 and 62 against collapse due to their weight when vessel 60 is in an unloaded condition.

In the application of the instant invention to the membrane tank systems of FIGS. 4 and 5, for example, the one or more foam layers 58 in the inner hull corner sections 66 and 68, which are normally the points of high load bearing and potentially high and concentrated stresses, are selectively thinned as aforedescribed. Prior to application of the foam material 58 to the areas of converging corner walls 70–72 and 74–76 of the lower and upper corners 68 and 66 respectively, of the tank system of FIGS. 4–5, a backup material or packing 78 would first be inserted at the points of intersection of these walls. Backup material 78 is similar in structure and function to the previously described backup and filler material 38. After installation of filler 78, one or more layers of rigid urethane foam 58, e.g. the two layers of FIG. 5, can be installed over this filler and applied to the inner surfaces of the inner hull walls in order to form the overall tank insulation 58. In applying the foam insulation 58 either by spraying techniques or by way of previously molded sections, which would be curved in the case of the corner sections, the foam in the areas of these corners 66 and 68 should be of selectively less thickness than in the other portions of the overall foam layer or layers. This selective foam thinning will provide the corner foam sections for membrane tanks 60 and 62 with the desired hinge characteristic whereby these sections will deflect and bend without fracture and transfer stresses uniformly across the points of wall intersection or corner areas of the foam to the relatively flat foam areas covering the tank walls located adjacent these tank corners.

Figure 6:
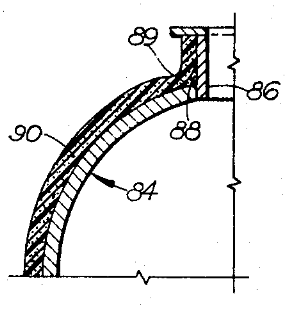
FIG. 6 is a fragmentary section of a spherical free-standing vessel which can incorporate the teachings of the instant invention in the construction thereof.

The same foam hinge concept can also be used to advantage in the case of the corner areas 80 of hull structure 50, where the trunk 64 for hull structure 50 is connected to the inner hull 54 as indicated in some detail in FIG. 4. In a similar fashion and as noted in FIG. 6, the instant invention is applicable to corner sections involving the joinder of a spherical free-standing tank 84 and a filling trunk 86. In this case, the outside corner section 88 between tank 84 and trunk 86 is covered with a cryogenic polyurethane foam insulation 90 of the appropriate composition, thinned in the area of corner section 88 and backed up by apropriate filler material 89.

A further advantageous embodiment of the invention is illustrated in FIG. 8, wherein a wet wall corner section of foam may be corrugated in addition to being thinned to constitute an improved wet wall tank structure over the prior art as represented, for example, by U.S. Pat. No. 3,757,982. The corrugations advantageously parallel the main axis of the corner joint or intersection of walls and in the event the individual foam layers 92 and 93 making up foam insulation 58 are applied by spraying, the filler or backer material 78 can be provided with corrugations prior to emplacement by being mold formed or by being fabricated as an extrusion. The individual foam layers 92 and 93 of FIG. 8 can be separated by a layer 94 of reinforcing nylon, polyester, or by aluminum foil 32 in the fashion disclosed in the aforesaid patent of Herbert H. Borup.

In the event filler materials 38 or 78 are made of a urethane foam, they should preferably comprise open cell and low density foams while the associated rigid and selectively thinned insulating foam layers making up the adjacent foam insulation 28 or 58 should be closed cell, high density foam.

Figure 9:
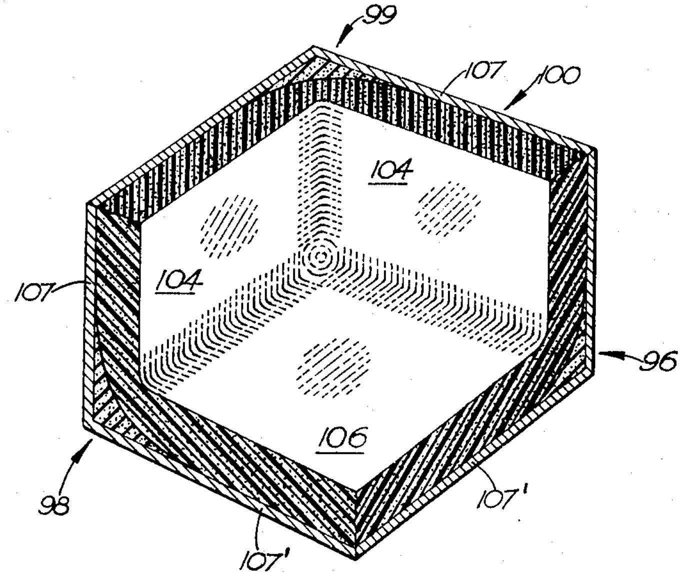
FIG. 9 is a fragmentary perspective view of an interior corner section of a transport vessel cargo tank incorporating the teachings of the instant invention, such as the cargo tank of the type shown in FIG. 4 with parts removed.

As indicated in FIG. 9, when a plurality of angularly disposed corner sections 96, 98 and 99 of a foam insulated containment vessel structure, such as is shown in FIG. 4, converge, they produce an arcuate, three dimensional corner 100. Corner 100 because of the selectively thick/thin foam sections in one or more foam layers making up side foam insulation 104 and bottom insulation 106, is well adapted to accept both static and dynamic loads and to transfer such loads uniformly across the thinned and curved corner areas of the foam to the flat foam areas making up foam sides 104 and foam bottom 106. In other words, the relatively rigid foam which insulates the metal sidewalls 107 and bottom 107' in corner 100 is advantageously hinged in a plurality of planes.

Figure 7:
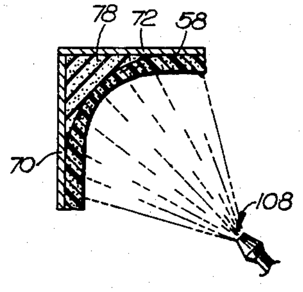
FIG. 7 is a schematic view indicating how the thickness of the foam can be advantageously controlled by spray application.

Spraying the foam in place can be used as an advantageous technique for insulating the containment structures disclosed and discussed herein in accordance with the instant invention. Thus, as illustrated in FIG. 7, when overall foam layer 58 is formed by a spray application technique in a corner section of the membrane-type tank of FIG. 4, the thick-thin cross-sectional relationship of one or more foam layers making up such insulated corner section can be readily achieved and more accurately controlled. One reason for this is that a greater build up or thickness of the foam usually occurs during the spraying at the outer reaches of a corner than in the center of the corner by virtue of the greater distance that exists from the center of the spray arc to the usual foam applicator spray nozzle 108 than from the sides of the spray arc to such nozzle. This also can mean that the areas of least thickness in the arcuate corner segment of foams would be substantially coincident with the center of the arc. When the rigid foam layer or layers are sprayed on, it is understood of course that the backup layer, e.g. layer 78, will first have been emplaced.

Advantageous embodiments of the invention have been described.

What is claimed is:

1. A method of insulating the corner section of a cryogenic liquid containment structure comprising the steps of packing a selected amount of a given filler material against a pair of converging walls in the area of the intersection of the walls of the said structure, thereafter progressively spraying selected portions of the surfaces of the converging walls adjacent their point of intersection as well as the previously packed filler material with an insulating cryogenic thermosetting polyurethane foam materials of a selected density and cell formation to produce at least one rigid insulating layer of the foam material and while spraying said foam material in place and allowing it to be cured in situ effecting a smaller build up and less thickness of the foam material in the area of the previously packed filler material and wall surface convergence than on the wall surfaces adjacent thereto with the thinner section of the foam material insulating layer having a thickness that can be as much as one-third less than that of the thickest section of the said foam material insulating layer while providing a load transfering hinge in the said layer.

2. The method as set forth in claim 1 including the step of forming corrugations at least in the thinner part of said insulating layer.

3. The method as set forth in claim 1 including the step of forcing the thinner portion of said insulating layer to assume an arcuate configuration in cross section during the application and curing of the foam material in situ.

4. The method as set forth in claim 1 including the step of utilizing an open cell low density urethane foam material for the filler material and a closed cell high density polyurethane foam material for the insulating layer.

5. The method as set forth in claim 1 including the step of spraying the foam material of the insulating layer at such an angle to the converging wall surfaces and their point of convergence that the greatest build up of foam during spraying will occur at the outer reaches of the corner formed by said converging wall surfaces rather than in the center of the corner.

* * * * *

UNITED STATES PATENT OFFICE
CERTIFICATE OF CORRECTION

PATENT NO. : 4,032,608

DATED : June 28, 1977

INVENTOR(S) : Theodore C. Zinniger and Phillip J. Burke

It is certified that error appears in the above-identified patent and that said Letters Patent are hereby corrected as shown below:

Column 1, line 35, "prior U. S." should be --prior art U. S.--

Column 1, line 41, "intant" should be --instant--

Column 2, line 21 "to" second occurrence should be --for--

Column 4, line 47, "tapers" should be --tapered--

Column 5, line 20, "This" should be --Thus--

Column 8, line 4, "materials" should be --material--

Signed and Sealed this

*Sixth* Day of *December 1977*

[SEAL]

*Attest:*

RUTH C. MASON
*Attesting Officer*

LUTRELLE F. PARKER
*Acting Commissioner of Patents and Trademarks*